(12) United States Patent
McConnell et al.

(10) Patent No.: US 9,171,672 B2
(45) Date of Patent: Oct. 27, 2015

(54) STACKED LEADED ARRAY

(75) Inventors: John E. McConnell, Simpsonville, SC (US); John Bultitude, Simpsonville, SC (US); Lonnie Jones, Simpsonville, SC (US); Alan Webster, Simpsonville, SC (US)

(73) Assignee: Kemet Electronics Corporation, Simpsonville, SC (US)

( * ) Notice: Subject to any disclaimer, the term of this patent is extended or adjusted under 35 U.S.C. 154(b) by 165 days.

(21) Appl. No.: 13/533,283

(22) Filed: Jun. 26, 2012

(65) Prior Publication Data

US 2013/0016488 A1     Jan. 17, 2013

Related U.S. Application Data

(60) Provisional application No. 61/505,400, filed on Jul. 7, 2011, provisional application No. 61/501,400, filed on Jun. 27, 2011.

(51) Int. Cl.
*H05K 7/06* (2006.01)
*H01G 4/232* (2006.01)
*H01G 4/38* (2006.01)

(52) U.S. Cl.
CPC . *H01G 4/232* (2013.01); *H01G 4/38* (2013.01)

(58) Field of Classification Search
CPC ........................................................ H05K 7/06
USPC ................. 361/301.4, 306.3, 774, 790, 321.4
See application file for complete search history.

(56) References Cited

U.S. PATENT DOCUMENTS

| | | | |
|---|---|---|---|
| 4,193,106 | A | 3/1980 | Coleman |
| 5,195,019 | A | 3/1993 | Hertz |
| 6,185,088 | B1 | 2/2001 | Youker et al. |
| 6,924,967 | B1 | 8/2005 | Devoe |
| 7,164,573 | B1 | 1/2007 | Prymak |
| 7,352,563 | B2 | 4/2008 | Pelcak et al. |
| 2006/0032666 | A1 | 2/2006 | Kim et al. |
| 2006/0092591 | A1 | 5/2006 | Yuan et al. |
| 2007/0076348 | A1 | 4/2007 | Shioga et al. |
| 2007/0096345 | A1 | 5/2007 | Bultitude |
| 2009/0147440 | A1 * | 6/2009 | Cygan et al. ........... H01G 4/232 361/306.3 |
| 2009/1474440 | | 6/2009 | Cvgan |
| 2011/0043963 | A1 * | 2/2011 | Bultitude et al. ........ H01G 2/16 361/321.4 |

OTHER PUBLICATIONS

Stefen Sedlmaier, European Search Report, 12173791.0-2214, Oct. 10, 2012.
Stefan Sedlmaier, Primary Examiner for the Examining Division of European Patent Office; European Examination Report for EP 12173791.0; Oct. 28, 2013.

\* cited by examiner

*Primary Examiner* — Jenny L Wagner
*Assistant Examiner* — Michael P McFadden
(74) *Attorney, Agent, or Firm* — Joseph T. Guy; Perkins Law Firm, LLC

(57) ABSTRACT

A stacked leaded array is provided wherein the stacked leaded array allows for increased packing density of electronic components. The stacked leaded array has a multiplicity of electronic components in a stacked array. Each electronic component comprises a first termination and a second termination. A multiplicity of first leads are provided wherein each first lead is in electrical contact with at least one first termination. Second leads are in electrical contact with second terminations.

14 Claims, 15 Drawing Sheets

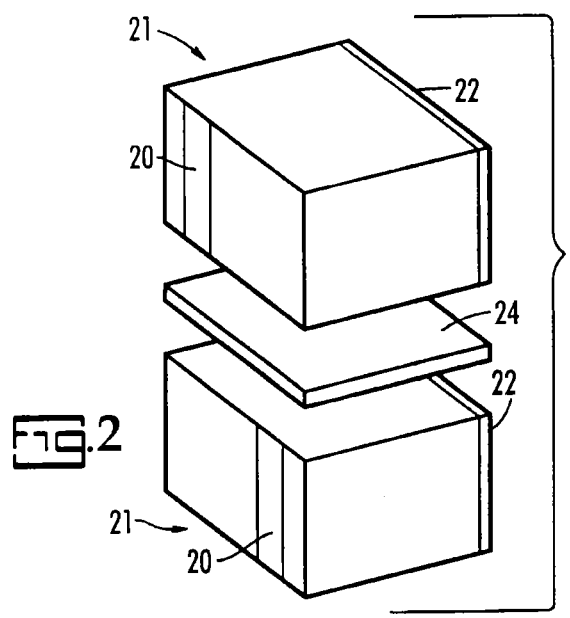
FIG.2
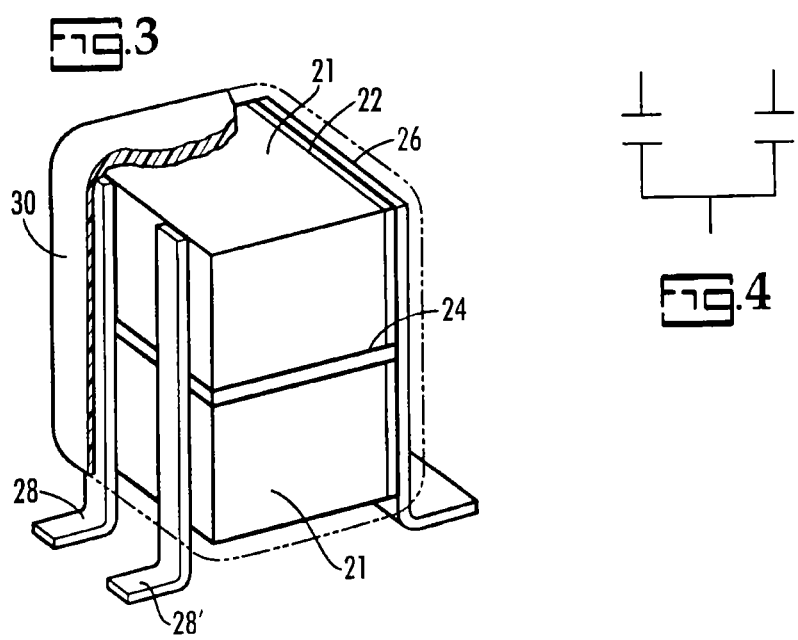
FIG.3
FIG.4

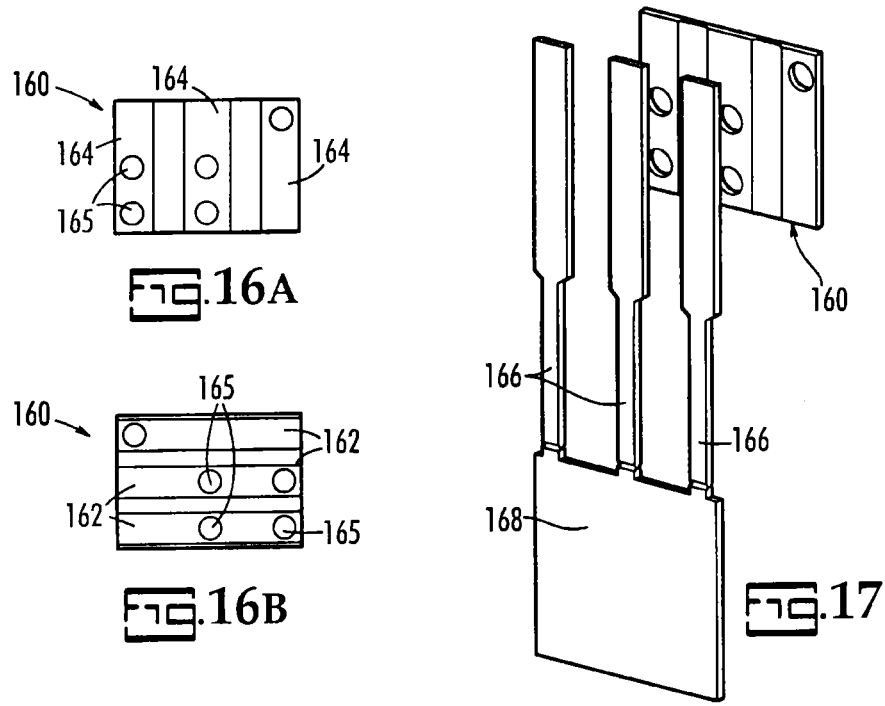
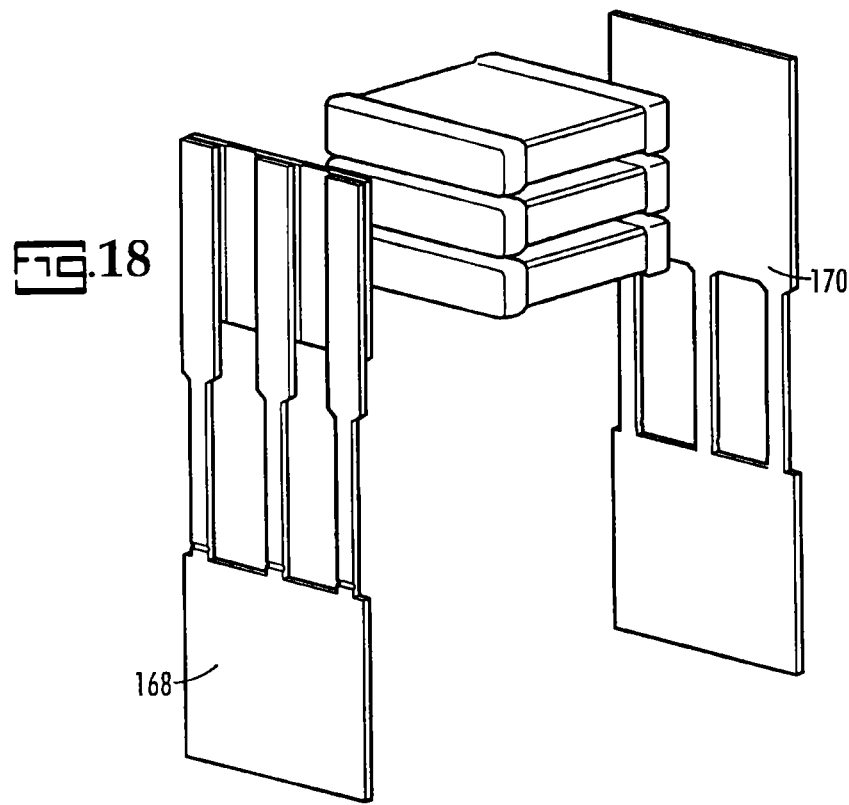

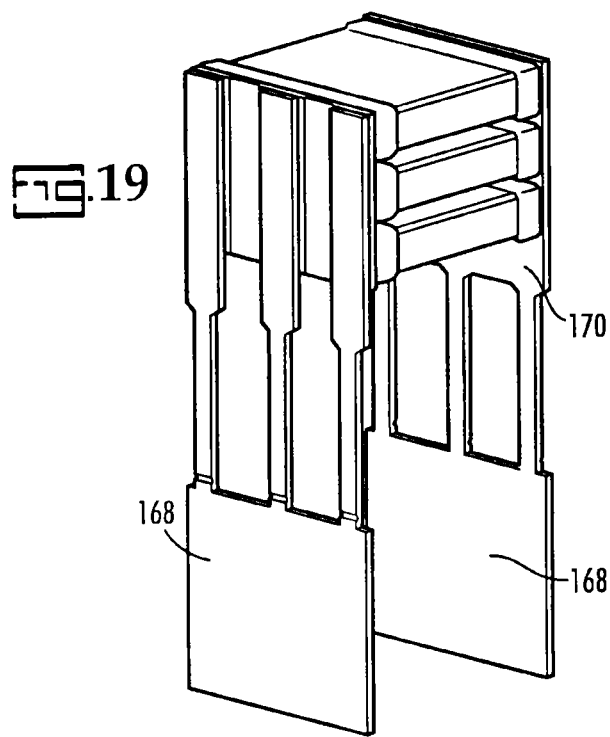
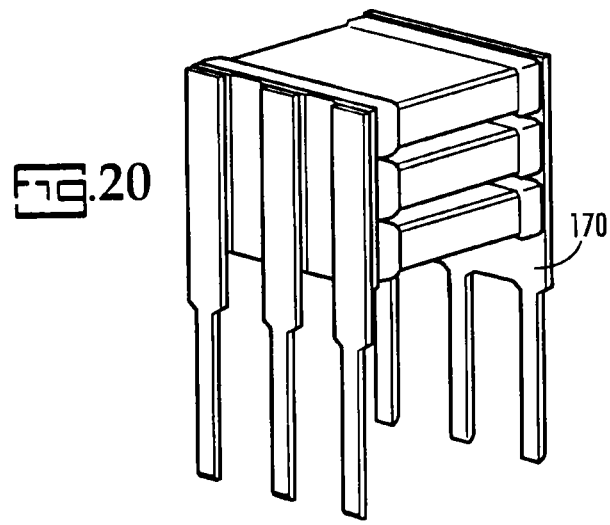

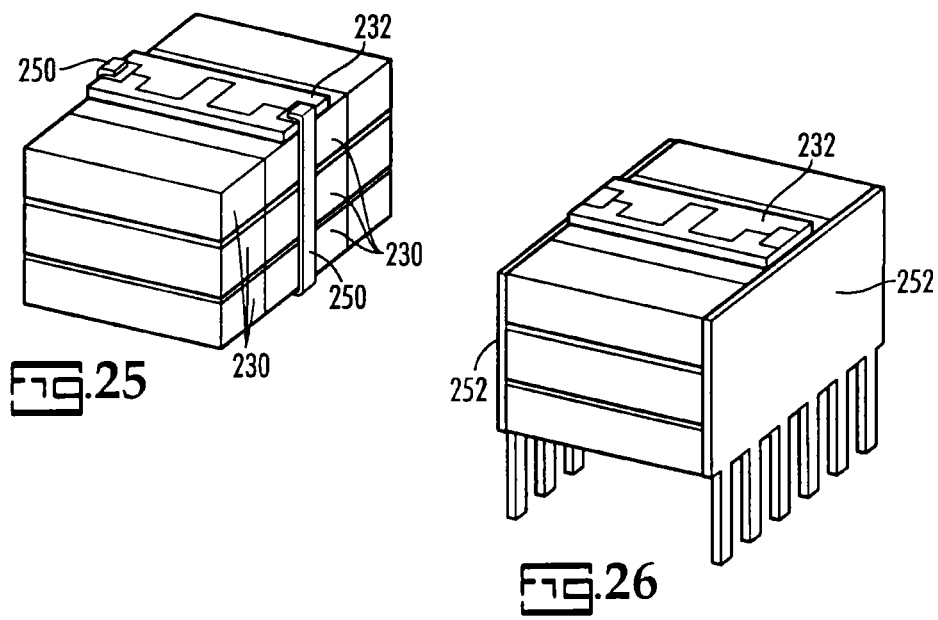
FIG. 25
FIG. 26
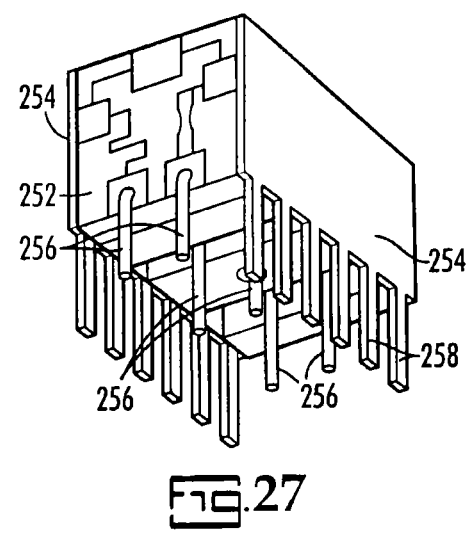
FIG. 27

STACKED LEADED ARRAY

CROSS-REFERENCE TO RELATED APPLICATIONS

The present application claims priority to U.S. Provisional Patent Application No. 61/501,400 filed Jun. 27, 2011 and to U.S. Provisional Patent Application No. 61/505,400 filed Jul. 7, 2011 both of which are incorporated herein by reference.

BACKGROUND

The present invention is related to a stacked leaded array. More specifically, the present invention is related to stacked electronic components, including tabbed and multi-layered ceramic capacitors (MLCCs), in a common array for improved volumetric efficiency and functionality improvements in a circuit of a given volume.

Miniaturization is an ongoing effort in electronic circuit and component design. These efforts are particularly relevant in the design of capacitors since capacitance is a function of the overlap area between internal electrodes of opposed polarity as well as the thickness and permittivity of the dielectric material between them. The capacitance per unit of volume of the individual capacitor can therefore be increased using a higher overlap area combined with thinner dielectric or increasing the permittivity of the dielectric.

However, there are two primary approaches to miniaturization. One approach is to miniaturize the individual components as described above. This approach has achieved great benefits yet the ability to further miniaturize the components requires significant technical discovery. The second approach is to increase functionality within a given volume. This approach requires significant advances in component interconnectivity and packaging.

The present invention provides significant advances in circuit miniaturization by stacking components, particularly MLCCs and other passive components, into a stacked array thereby improving the overall volumetric efficiency. By combining thinner components in a stacked leaded array the surface area required for mounting in the circuit is reduced whilst remaining within the maximum height requirements so improving overall volumetric efficiency.

SUMMARY

It is an object of the invention to provide a stacked array of passive components, and particularly capacitors.

It is another object of the invention to provide a stacked array of components wherein each component has separate termination.

A particular feature of the invention is the ability to stack components vertically and horizontally with a minimum footprint.

Another feature of the invention is the ability to stack components of different sizes and functionality in a common package.

Another feature is improved functionality which can be achieved per unit volume.

These and other advantages, as will be realized, are provided in a stacked leaded array. The stacked leaded array has a multiplicity of electronic components in a stacked array. Each electronic component comprises a first termination and a second termination. A multiplicity of first leads is provided wherein each first lead is in electrical contact with at least one first termination. Second leads are in electrical contact with second terminations.

SUMMARY OF FIGURES

FIG. 2 is an exploded view of an embodiment of the invention.
FIG. 3 is a top perspective view of an embodiment of the invention.
FIG. 4 is an electrical schematic diagram of an embodiment of the invention.
FIG. 16 is a front and back view of an interconnector of the instant invention.
FIGS. 17 and 18 are exploded perspective views of an embodiment of the invention.
FIG. 19 is a top perspective view of an embodiment of the invention.
FIG. 20 is a top perspective view of an embodiment of the invention.
FIG. 25 is a top perspective view of an embodiment of the invention.
FIG. 26 is a top perspective view of an embodiment of the invention.
FIG. 27 is a bottom perspective view of an embodiment of the invention.

DETAILED DESCRIPTION

The present invention is specific to a stacked leaded array of electronic components, particularly capacitors, for improved volumetric efficiency. More specifically, the present invention is specific to stacked array of passive electronic components with increased functionality per unit volume.

The present invention will be described with reference to the various figures which form an integral, non-limiting, component of the disclosure. Throughout the description similar elements will be numbered accordingly.

Figure 1:
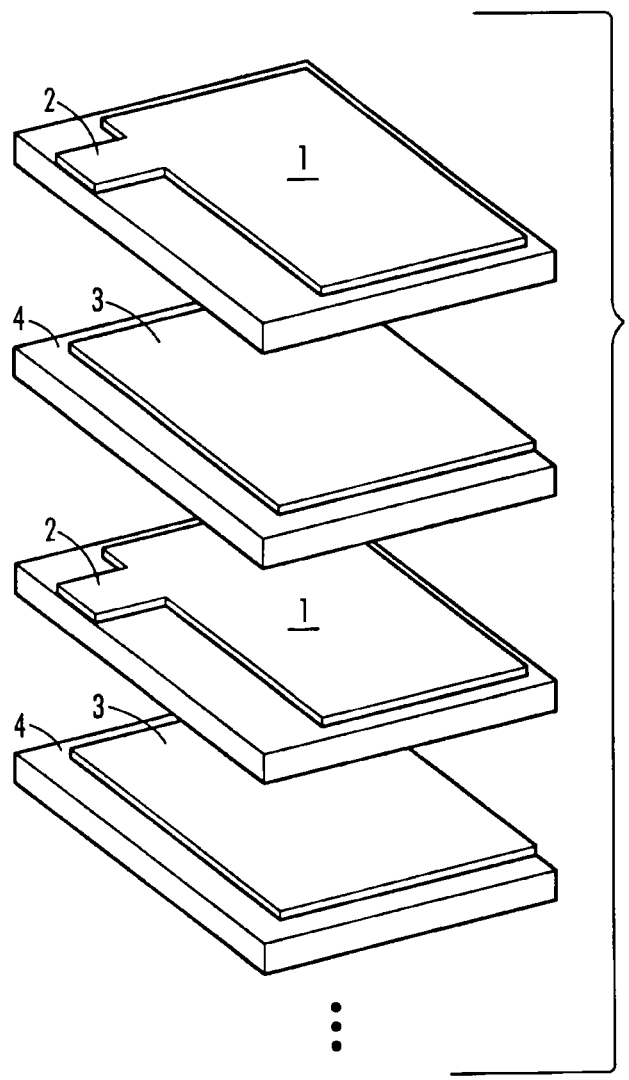
FIG. 1 is an exploded view of an embodiment of the invention.

An embodiment of the invention will be described with reference to FIGS. 1-3 wherein illustrated in FIG. 1 are tabbed electrodes. The tabbed electrodes are thin planer electrodes as well known in the art with an active region, 1, and tabs. In the embodiment of FIG. 1, every other electrode has a narrow tab, 2, which when layered the narrow tabs align for common electrical connectivity to an external termination. The electrodes of opposite polarity are illustrated with a wide tab, 3, which may be the width of the electrode and when layered the wide tabs are in electrical conductivity with a second external termination. A dielectric, 4, is between the electrodes. Wide and narrow tabs can be used interchangeably throughout the description and each will be demonstrated over the course of the various embodiments. A stack of two assembled capacitors, prepared from the electrodes of FIG. 1, is illustrated in exploded view in FIG. 2 wherein the two capacitors are oriented such that the narrow tabs are not aligned. An external termination, 20, is attached to the aligned narrow tabs. Similarly, an external termination, 22, is in electrical contact with the wide tabs. An optional, but preferred, insulator, 24, is between the capacitors.

A stacked array of capacitors, wherein capacitors are stacked on each other in one dimension, is illustrated in partial cut-away view in FIG. 3 wherein two capacitors, as described relative to FIG. 2, are stacked with an optional, but preferred, insulator, 24, there between. The external termination, 22, of the wide tabs are in electrical contact with a common lead, 26. The common lead will typically be electrically connected to ground without limit thereto. Separate leads, 28 and 28', are in electrical contact with the external terminations, 20, of each capacitor. The entire stack, except for the ends of the leads, is optionally encased in a non-conductive resin, 30. Encasing may be preferred for applications in harsher environments to provide a barrier to moisture penetration and additional mechanical robustness.

An electrical schematic diagram of the stacked capacitor of FIG. 3 is provided in FIG. 4.

A stacked array of components is defined herein as components stacked on each other in one two or three dimensions with or without circuit substrates and insulators there between.

Figure 5:
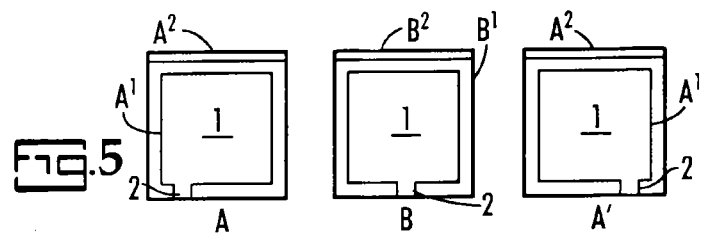
FIG. 5 is a partial view of an embodiment of the invention.

An embodiment of the invention will be described with reference to FIGS. 5-7. In FIG. 5 internal electrodes are illustrated as A wherein the narrow tab, 2, is offset from the center. A capacitor formed from a stack of alternating electrodes, A and A', would have the external termination displaced to the side represented as capacitors C1 and C3 in FIG. 7 which will be more fully described. Internal electrodes A' are identical to A except the finished capacitor is rotated prior to incorporation into a stack such that the narrow tabs are displaced relative to each other as realized by comparing capacitors C1 and C3 in FIG. 7 which are in electrical contact with leads T1 and T3 respectively. Internal electrodes B of FIG. 5 have a central narrow tab which, when layered with a capacitor using electrodes A, the external terminations would not overlap.

Figure 6:
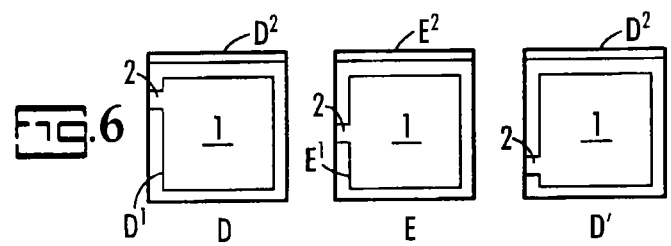
FIG. 6 is a partial view of an embodiment of the invention.

FIG. 6 illustrates internal electrodes with tabs on the side adjacent to the wide tab with D and D' being identical except for their rotation relative to each other.

Figures 7, 8, 9:
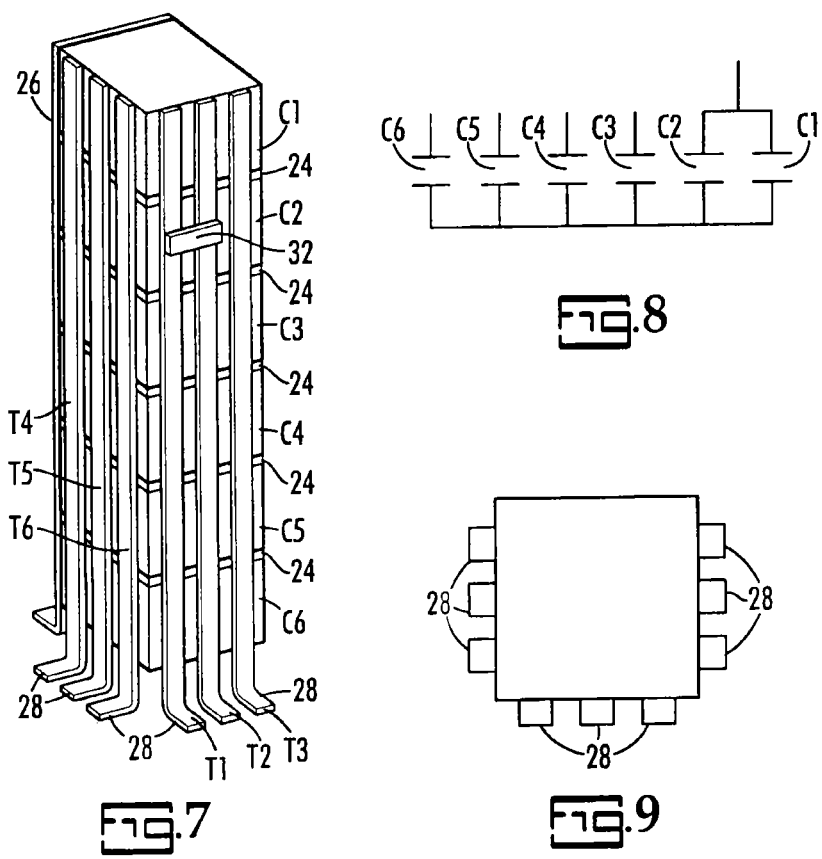
FIG. 7 is a top perspective view of an embodiment of the invention.
FIG. 8 is an electrical schematic diagram of an embodiment of the invention.
FIG. 9 is a top view of an embodiment of the invention.

FIG. 7 illustrates a stacked capacitor wherein capacitor C1 is formed using a stack of internal electrodes A, C2 is formed using a stack of internal electrodes B, C3 is formed using a stack of internal electrodes A with the capacitor rotated such that the external termination does not overlap with C1, C4 is formed using a stack of internal electrodes D, C5 is formed using a stack of internal electrodes E and C6 is formed using a stack of internal electrodes D with rotation relative to C4. Capacitor C1 would be in electrical contact with lead T1, capacitor C2 with lead T2, etc. Each capacitor is illustrated separated from each adjacent capacitor with an optional, but preferred, insulator, 24. A common lead, 26, is in electrical contact with all wide tabs and each narrow tab is in electrical contact with a single lead, 28. A tie bar, 32, is illustrated connecting the single lead between capacitors C1 and C2. Tie bars can be used to connect any combination of leads.

An electrical schematic diagram of the stacked capacitor of FIG. 7 is provided in FIG. 8 wherein capacitors C1 and C2 are in electrical parallel.

An embodiment of the invention is illustrated in top schematic view in FIG. 9 wherein a stack of nine capacitors is illustrated with six capacitors arranged as illustrated in FIG. 7 and three additional capacitors which are identical to capacitors C4-C6 of FIG. 7 stacked such that the external terminations do not overlap with the external terminations of capacitors C4-C6.

Figure 11:
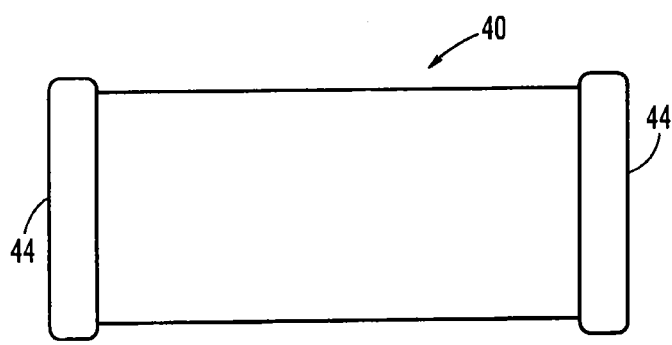
FIG. 11 is a side partial view of an embodiment of the invention.
Figure 12:
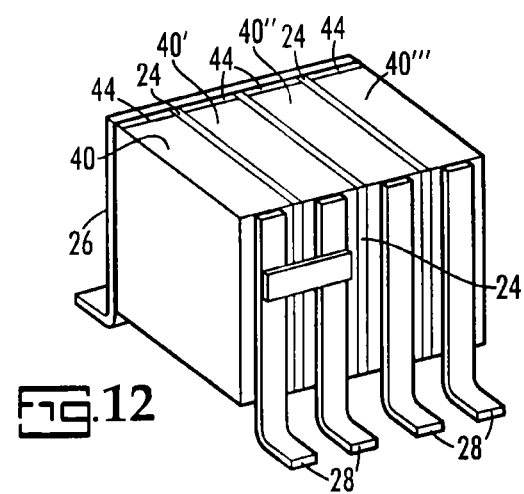
FIG. 12 is a top perspective view of an embodiment of the invention.

An embodiment of the invention will be described with reference to FIGS. 10-12. A multilayered ceramic capacitor (MLCC) is illustrated in cross-sectional view in FIG. 10, and in side view in FIG. 11. A stack of four MLCCs is illustrated in FIG. 12.

Figure 10:
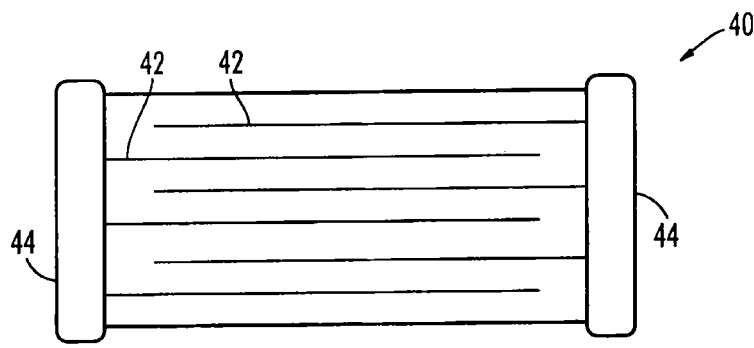
FIG. 10 is a cross-sectional partial view of an embodiment of the invention.

In FIG. 10 the MLCC, 40, comprises internal planar electrodes, 42, with dielectric there between wherein the internal planar electrodes terminate at external terminations, 44, in alternating fashion as well understood for MLCC capacitors. A stack of four MLCCs, 40, is illustrated in FIG. 12 with an optional, but preferred insulator, 24, between adjacent MLCCs. Four MLCCs are used for the purposes of illustration with the understanding that the number is neither limited thereto nor limited herein. A common termination, 26, is in electrical contact with all external terminations on a common side and each external termination on the opposing side is in electrical contact with a separate single lead, 28. A tie bar, 32, is illustrated connecting adjacent single leads even though it would be understood herein that tie bars are optional and may be between any combination of leads.

Figure 13:
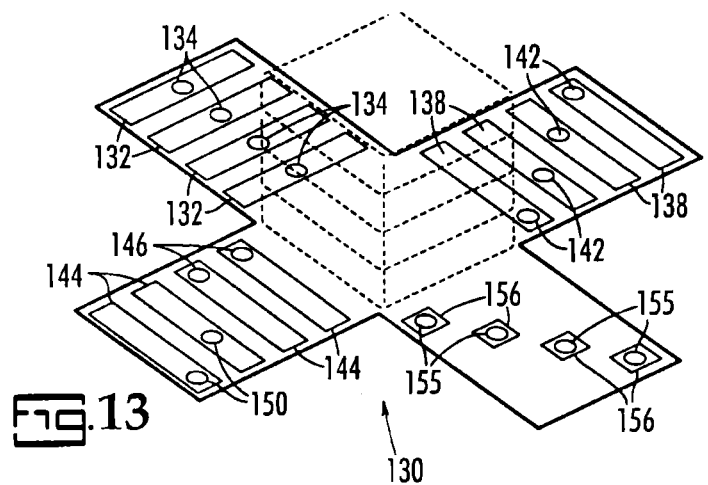
FIG. 13 is a top perspective view of an embodiment of the invention.
Figure 14:
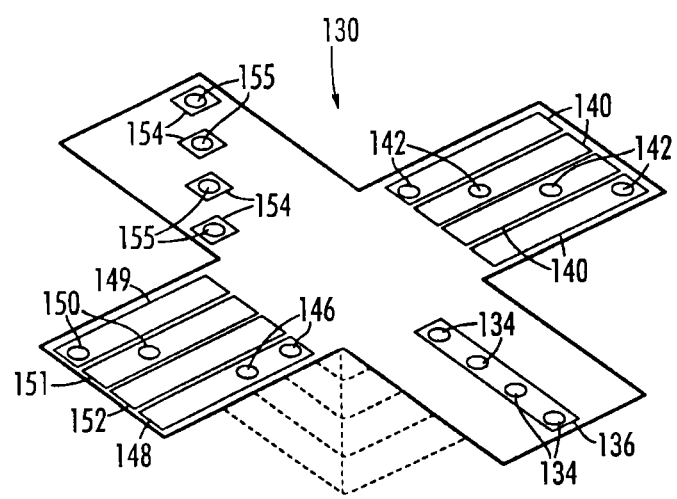
FIG. 14 is a bottom perspective view of an embodiment of the invention.

An embodiment of the invention will be described with reference to FIGS. 13-15. An interconnect, 130, for stacking multiple capacitors is illustrated in top view in FIG. 13 and in front view in FIG. 14. The interconnect is suitable for use with components including tab capacitors or MLCC type capacitors and can simultaneously form electrical connectivity to multiple faces of stacked components. The top of the interconnect, as illustrated in FIG. 13, comprises a series of traces which are arranged to connect to the external terminations of components. By way of illustration, component traces, 132, may each form an electrical connection to a tab of a tab capacitor, an external termination of an MLCC or an electrical component, on a first face. Through holes, 134, electrically connect the component traces, 132, to a common lead attachment trace, 136, on the bottom of the interconnect as illustrated in FIG. 14. Second component traces, 138, are illustrated as being suitable to form an electrical connection to external terminations on the faces of capacitors which are adjacent to the first face of each capacitor. The second component traces are in electrical contact with external lead attachment traces, 140, by through holes, 142. Third component traces, 144, are illustrative of traces wherein the through holes, 146, form an electrical contact with a single lead attachment trace, 148, whereas through holes 150 each form an electrical contact with a single lead attachment trace, 149 and 151. In this case a trace, 152, is not employed. Component traces 156, are arranged to form an electrical contact preferably with a narrow external termination, such as narrow tabs of a tab capacitor, and are electrically connected to lead attachment traces, 154, by through holes, 155.

Figure 15:
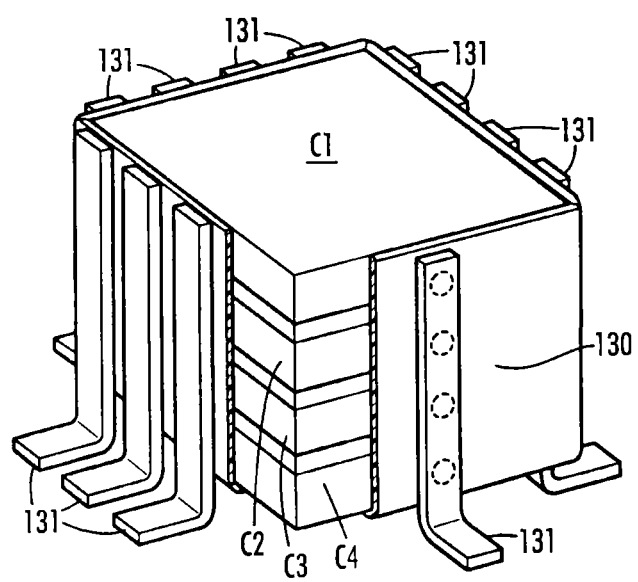
FIG. 15 is a top perspective view of an embodiment of the invention.

A stacked capacitor utilizing the interconnect of FIGS. 13 and 14 is illustrated in partial cut-away view in FIG. 15. In FIG. 15, the capacitors, C1-C4, are encased within the interconnect, 130, and external leads, 131, are attached thereto. While illustrated with four capacitors for convenience the number of stacked capacitors could be quite large.

An interconnect for stacked components, and particularly stacked capacitors, will be described with reference to FIGS. 16-20. The front side of the interconnect, 160, is illustrated in FIG. 16A and the back side of the interconnect is illustrated in FIG. 16B. Connector traces, 162, are arranged to be individually electrically connectable to stacked components such as capacitors, C1-C3, as illustrated in FIGS. 17-20. Lead traces, 164, on the opposite side of the interconnect are electrically connected with the component traces by through holes, 165. For the purposes of illustration one component is separately terminated whereas two components are in parallel for this example without limit thereto as would be realized. The interconnect is electrically attached to a stack of components, particularly MLCCs or tab capacitors, on one face and to leads, 166, on the other face. For the purposes of illustration and description the leads are illustrated in FIG. 19 as being attached to a lead carrier, 168, which maintains the leads in proper position during manufacture and is then removed from the lead as illustrated in FIG. 20. A common lead, 170, connects all terminations on a common side as would be realized from the description herein.

Figure 21:
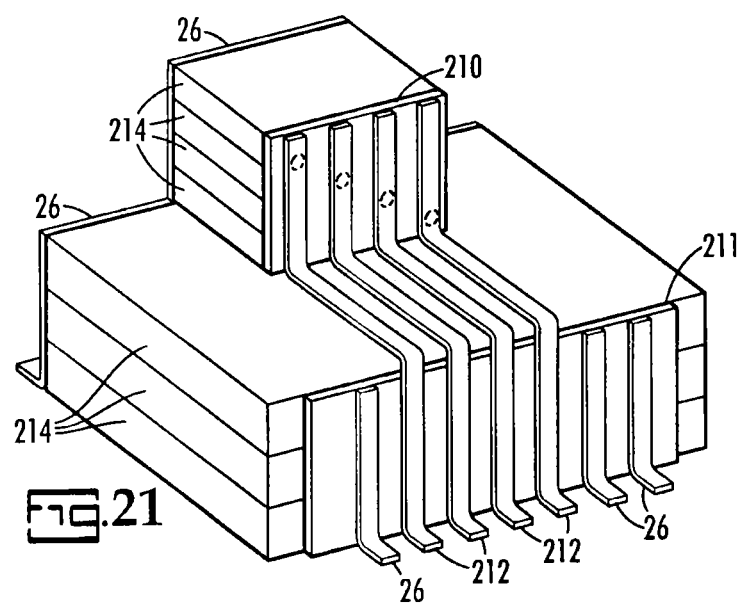
FIG. 21 is a top perspective view of an embodiment of the invention.

A particular advantage of the instant invention will be described with reference to FIG. 21 wherein a stacked leaded array is illustrated with individual components of different sizes. A stack of electronic components is illustrated wherein each component has two leads with the understanding that multiple leads can be employed on at least one component. Each component may be a capacitor or selected from the group consisting of resistors, varistors, inductors, fuses, diodes, thyristors and microprocessors. The components are preferably arranged such that a face of each component, 214, shares a common plane thereby allowing connection to a common lead, 26. An interconnect, 210, with leads, 212, can be used to form the electrical connectivity to a face of the stack of components. A second interconnect, 211, comprising leads, 26, can provide termination to some components as discussed elsewhere herein.

Figure 22:
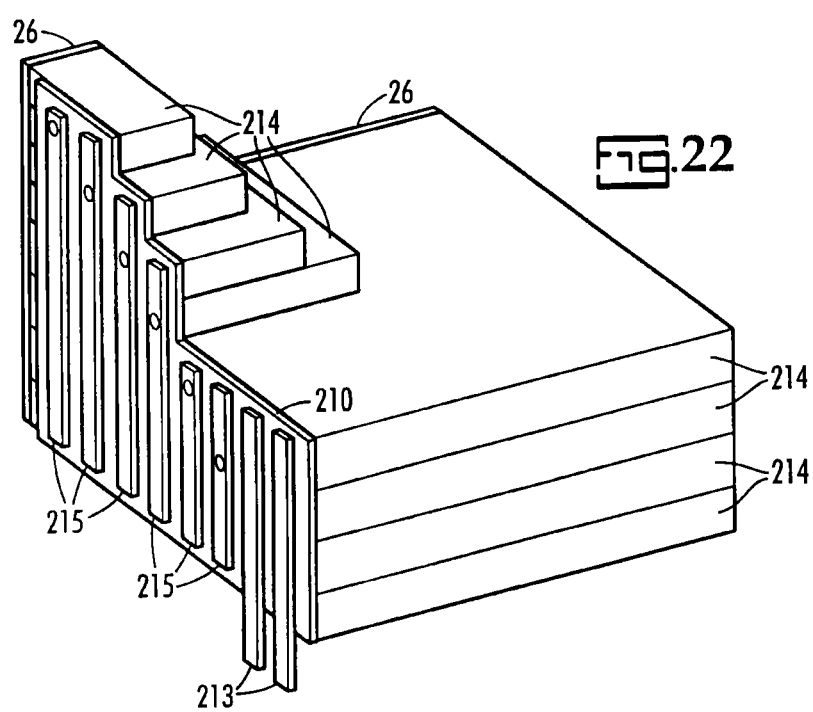
FIG. 22 is a top perspective view of an embodiment of the invention.

Another embodiment is illustrated in FIG. 22, wherein a multiplicity of components, 214, each with their own functionality, are arranged such that two faces are co-planer. One face is commonly terminated at 26, whereas an adjacent face is terminated by an interconnect, 210, with conductive traces, 215. The conductive traces can have a lead attached thereto or they can be combined in various combinations by other traces or conductivity on the opposing side of the interconnect which are not visible herein, as will be discussed further, with leads 213 connecting to a circuit board to provide the functionality of the entire stack as will be more fully realized after further discussion herein.

The interconnect utilizes flex circuit technology wherein conductors, typically copper, are formed as traces on the surface of a high temperature material known in the art as Kapton® and traces on opposing sides are electrically connected via through holes. Electronic components can be electrically connected to one side and leads to the opposite side of the interconnect.

Figure 23:
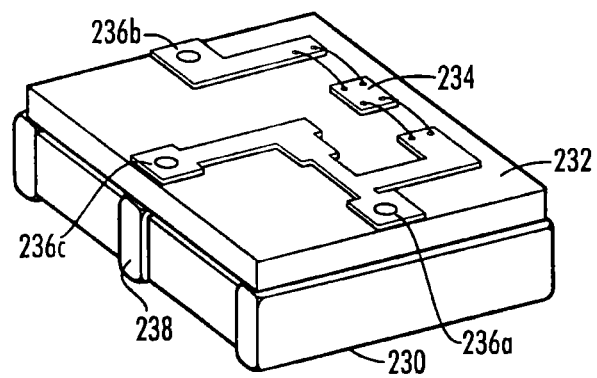
FIG. 23 is a top perspective view of an embodiment of the invention.

A stacked assembly of components is illustrated in top perspective view in FIG. 23. In FIG. 23, a component, 230, which is illustrated for convenience as an MLCC, is stacked with a circuit substrate, 232. The circuit substrate comprises functionality due to the presence of at least one integral electronic component, 234, mounted thereon. The circuit substrate illustrated has three connections, 236a-236c, with at least one connection electrically connected to a circuit board separately from the capacitor. A surface mount pad, 238, is preferably provided for connectivity of the circuit substrate connector by soldering or clip leads may be used as is well known in the art. For the purposes of the present invention an integral electronic component is a component which alters current passing there through selected from an inductor, a resistor, a varistor, a capacitor, a diodes, a thyristor and a microprocessor.

Figure 24:
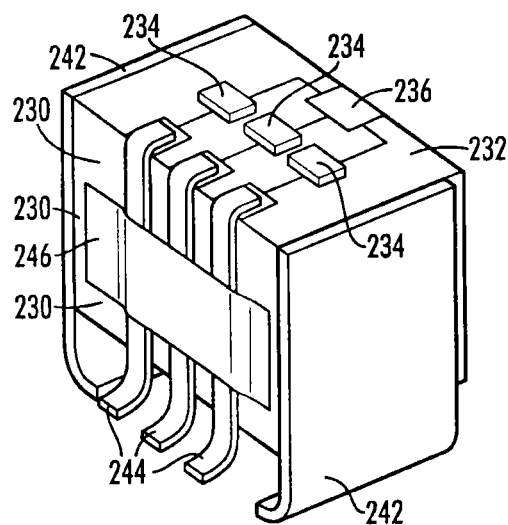
FIG. 24 is a top perspective view of an embodiment of the invention.

A stacked assembly of components is illustrated in top perspective view in FIG. 24. In FIG. 24 multiple components, 230, are commonly terminated by leads, 242, with a separately terminated circuit substrate, 232, stacked with the capacitors. The circuit substrate comprises integral electronic components, 234, which share a common ground terminal, 236, with each separately terminated by separate leads, 244. The separate leads can be secured in position by a non-conductive material, 246, such as Kapton® tape.

A stacked assembly of components is illustrated in FIG. 25 wherein a circuit substrate, 232, is stacked with a plurality of components, 230, with, preferably, flex leads, 250, providing connectivity to below the stack for connection to a circuit board. As illustrated in FIG. 26, common leads, 252 can be placed on either side of the capacitors with the flexible leads extending between the components and leads or external to the capacitors and leads.

A stacked assembly of components is illustrated in bottom perspective view in FIG. 27 wherein leaded circuit substrates, 232, are stacked with capacitors between lead frames, 254. The circuit substrate leads, 256, and lead frame leads, 258, are preferably inserted into through hole connections on a circuit board as known in the art.

Figure 28:
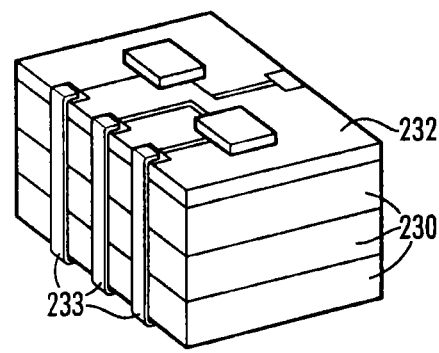
FIG. 28 is a top perspective view of an embodiment of the invention.
Figure 29:
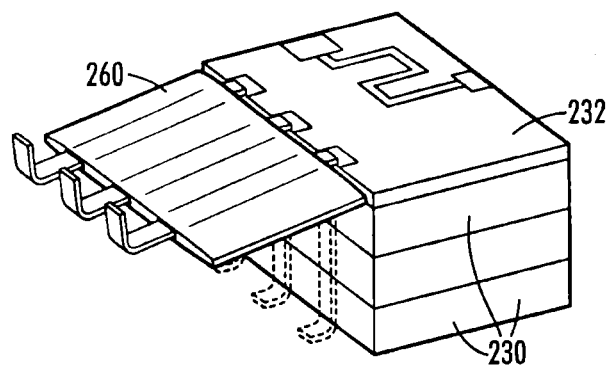
FIG. 29 is a top perspective view of an embodiment of the invention.

A stacked assembly of components is illustrated in FIG. 28 wherein a stack comprising capacitors, 230, and a circuit substrate, 232, are provided with conductive traces, 233, provided from the circuit substrate for connectivity. FIG. 29 illustrates a ribbon cable, 260, for connectivity within a stack of capacitors, 230, and circuit substrate, 232. The ribbon cable can be folded flat against the side of the stack to minimize space.

The interconnect allows the function of the components of the stacked array to be combined without increasing the volume of the stacked array. Components can be combined in parallel or in series and the interconnect can be functionalized.

Figure 30:
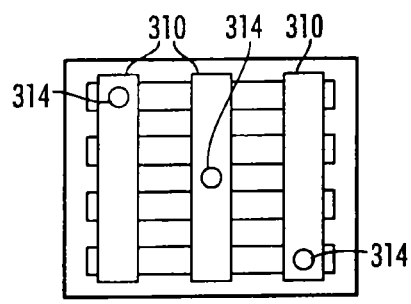
FIG. 30 is a front schematic view of an interconnect of the invention.
Figure 31:
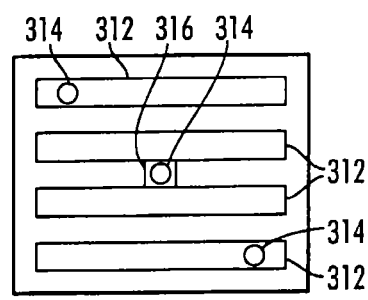
FIG. 31 is a back schematic view of an interconnect of the invention.
Figure 32:
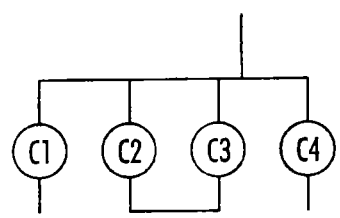
FIG. 32 is a schematic electrical diagram of an embodiment of the invention.
Figure 33:
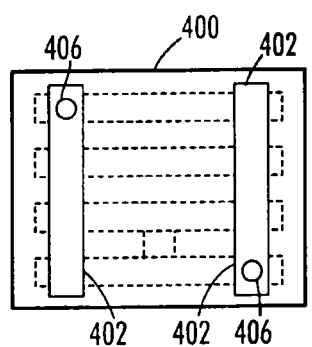
FIG. 33 is a front schematic view of an interconnect of the invention.

A functionalized interconnect is illustrated in front view in FIG. 30 wherein the lead traces, 310, are illustrated and in rear view in FIG. 31 wherein component traces, 312, are illustrated. Through holes, 314, connect the traces on opposing surfaces of the interconnect. A conductor bridge, 316, connects two component traces. Four components could be attached to the component traces with a common lead on the opposite side of the components to provide a functionality as illustrated in the electrical schematic illustrated in FIG. 32.

Figure 34:
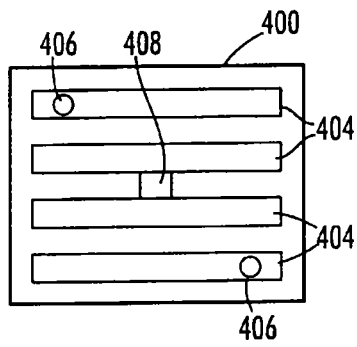
FIG. 34 is a back schematic view of an interconnect of the invention.

An particular advantage provided by the invention will be described with particular reference to FIGS. 33-38. A first interconnect, 400, is illustrated in rear view in FIG. 33 wherein the lead traces, 402, are illustrated. The front view of the first interconnect is illustrated in FIG. 34 wherein the component traces, 404, are illustrated. Through holes, 406, electrically connect select traces as would be realized whereas the center traces are connected by a conductor bridge, 408. As would be apparent the first interconnect is demonstrated for use with four components with two leads.

Figure 35:
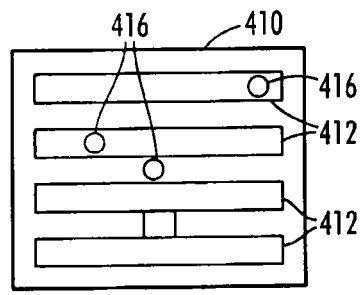
FIG. 35 is a front schematic view of an interconnect of the invention.
Figure 36:
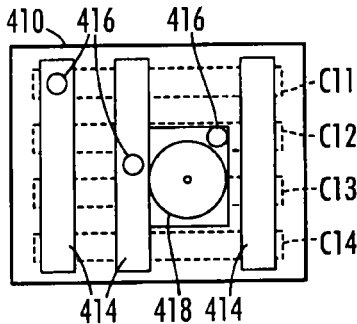
FIG. 36 is a back schematic view of an interconnect of the invention.

A second interconnect, 410, is illustrated in rear view in FIG. 35 wherein the component traces, 412, are illustrated, and in front view in FIG. 36 wherein the lead traces, 414, are illustrated. As would be realized the second interconnect is demonstrated for use with four components and three leads. Through holes, 416, provide connectivity through the insulative substrate. An integral interconnect component, 418, which is illustrated as an inductor for convenience, is in electrical contact with one trace, the center one for the purposes of illustration, by a through hole, and connected to component C12 through a second through hole. For the purposes of the present invention an integral interconnect component is a component which alters current passing there through selected from an inductor, a resistor, a varistor, and a capacitor.

Figure 37:
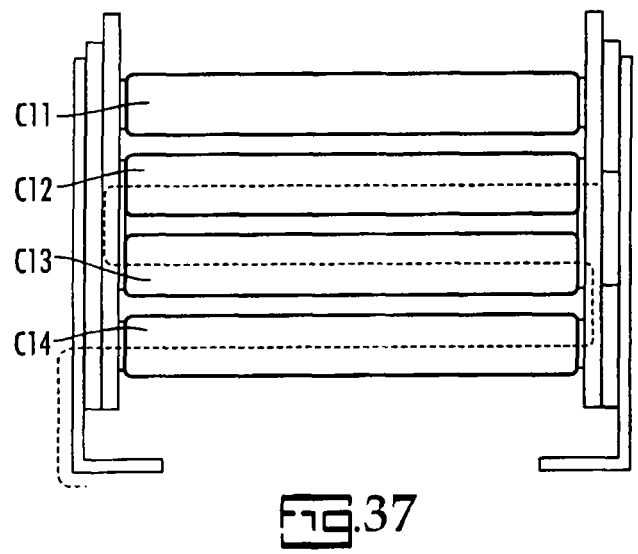
FIG. 37 is a side schematic view of an embodiment of the invention.
Figure 38:
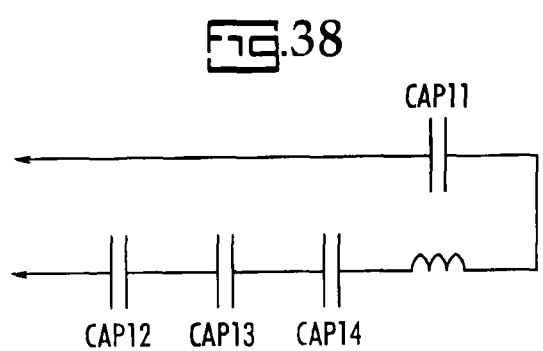
FIG. 38 is a schematic electrical diagram of an embodiment of the invention.

A stack of four components is illustrated in FIG. 37 wherein the first interconnect is on the left and the second interconnect is on the right. As would be realized, if the stack of four components included four capacitors they would provide the functionality illustrated as an electrical schematic in FIG. 38 while requiring very little more space than the combined volume of the four capacitors. Other components, and various combinations of traces, conductor bridges and interconnect mounted components could be used to easily provide other circuits such as an LC filter, a Pi filter or a T filter in a minimal volume.

Lead structures are not particularly limited herein with surface mount, through hole mount or clip on leads being suitable for demonstration of the invention.

The invention has been described with reference to the preferred embodiments without limit thereto. One of skill in the art would realize additional embodiments and improvements which are not specifically set forth but which are within the scope of the invention as more specifically set forth in the claims appended hereto.

The invention claimed is:

1. A stacked leaded array comprising:
    a multiplicity of electronic components in a stacked array wherein each electronic component of said multiplicity of electronic components comprises a first termination and a second termination;
    a multiplicity of first leads wherein a first lead of said first leads is in electrical contact with at least one said first termination and at least one second first lead of said first leads is in electrical contact with a second first termination wherein said first lead and said second first lead have common polarity and are not in electrical contact; and
    a second lead wherein said second lead is in electrical contact with each said second termination.

2. The stacked leaded array of claim 1 further comprising at least one interconnect wherein said interconnect is in at least one location selected from between said first termination and said first lead and between said second termination and said second lead and said interconnect comprises:
    a first side and a second side;
    component traces on said first side wherein said component traces are in electrical contact with one of said first terminations or said second terminations;
    lead traces on said second side wherein said lead traces are in electrical contact with one of said first leads or at least one said second lead; and
    at least one through hole conductor forming an electrical connection between at least one component trace of said component traces and at least one lead trace of said lead traces.

3. The stacked leaded array of claim 2 wherein said interconnect further comprises an integral interconnect component.

4. The stacked leaded array of claim 3 wherein said integral interconnect component is selected from the group consisting of an inductor, a resistor, a varistor, and a capacitor.

5. The stacked leaded array of claim 2 further comprising a conductive bridge.

6. The stacked leaded array of claim 1 wherein said component is selected from the group consisting of a capacitor, a resistor, a varistor, an inductor, a diod, a thyristor and a microprocessor.

7. The stacked leaded array of claim 6 wherein said component is selected from a tab capacitor and an MLCC.

8. The stacked leaded array of claim 1 further comprising an insulator between adjacent components.

9. The stacked leaded array of claim 1 further comprising at least one tie bar.

10. The stacked leaded array of claim 1 wherein at least one lead is in electrical contact with no more than two of said second terminations.

11. The stacked leaded array of claim 1 wherein said components are all the same size.

12. The stacked leaded array of claim 1 comprising at least two of said components.

13. The stacked leaded array of claim 1 further comprising a circuit substrate wherein said circuit substrate comprises a first terminal, a second terminal and an integral electrical component between said first terminal and said second terminal and at least one of said first terminal and said second terminal is in electrical contact with said first lead.

14. The stacked leaded array of claim 13 wherein said circuit substrate is stacked in said stacked array.

* * * * *